Oct. 15, 1957 A. G. BERGSTROM 2,809,481
PORTABLE TAP SHARPENING FIXTURE
Filed June 9, 1955 2 Sheets-Sheet 1
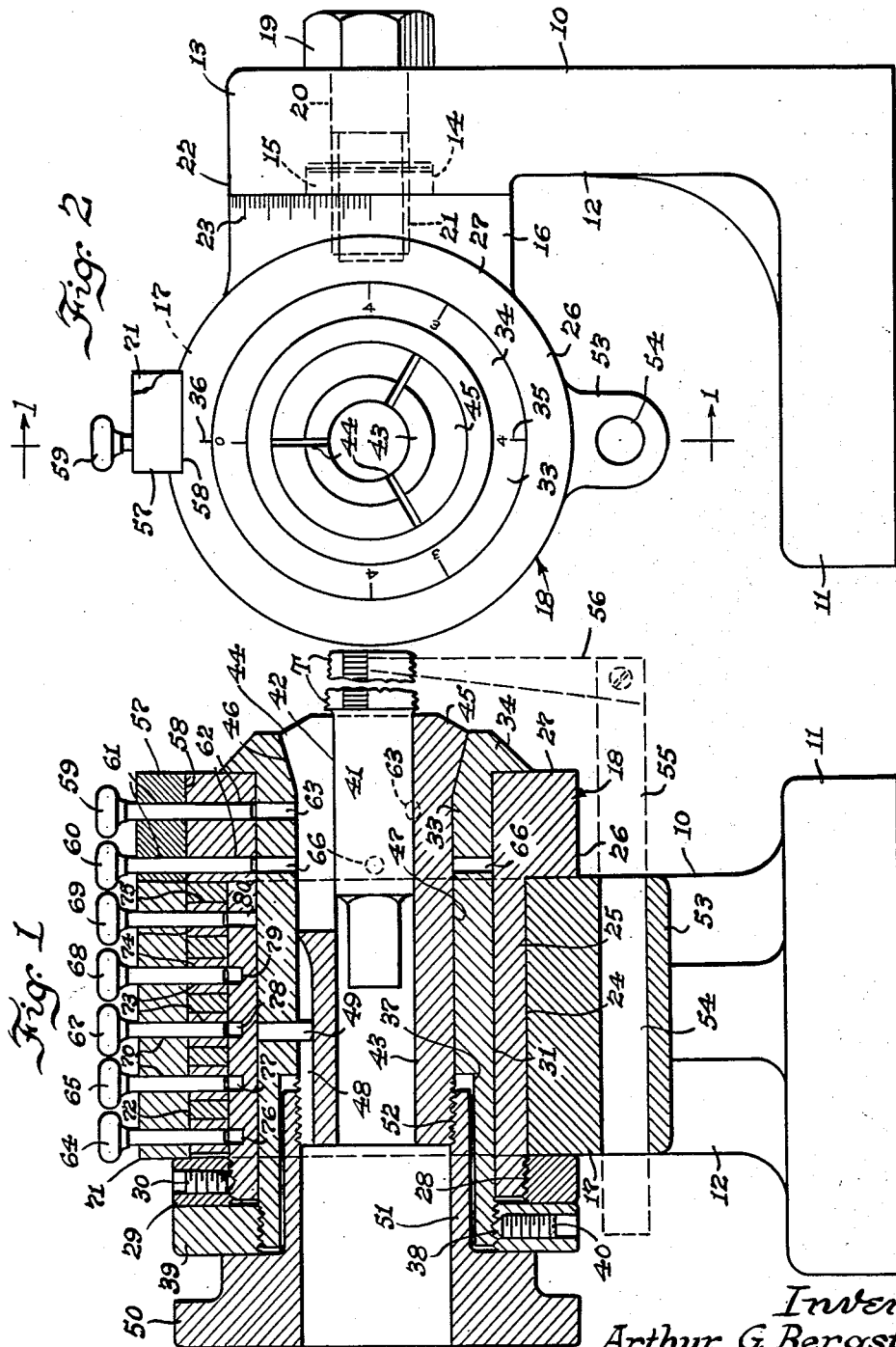
Inventor
Arthur G. Bergstrom Oct. 15, 1957  A. G. BERGSTROM  2,809,481
PORTABLE TAP SHARPENING FIXTURE
Filed June 9, 1955
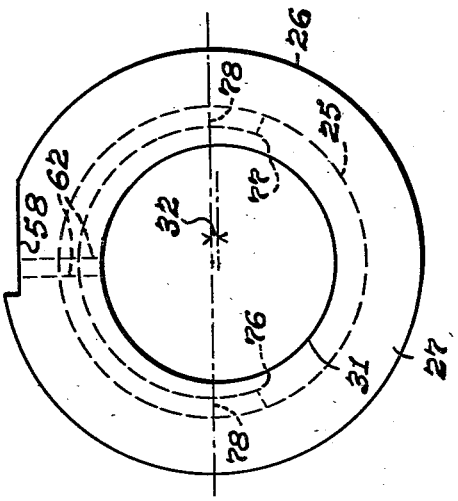
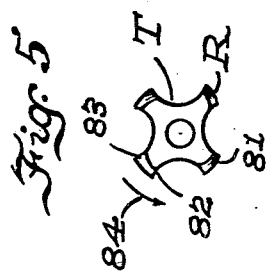
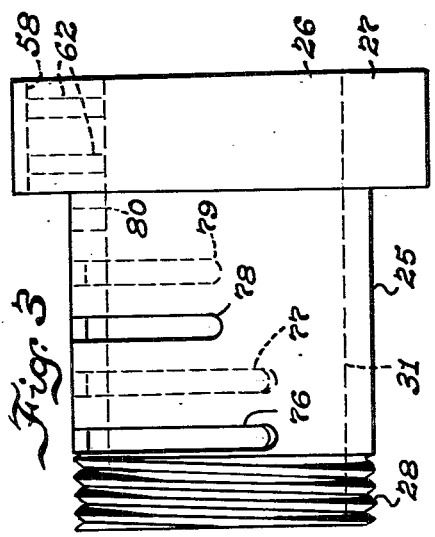
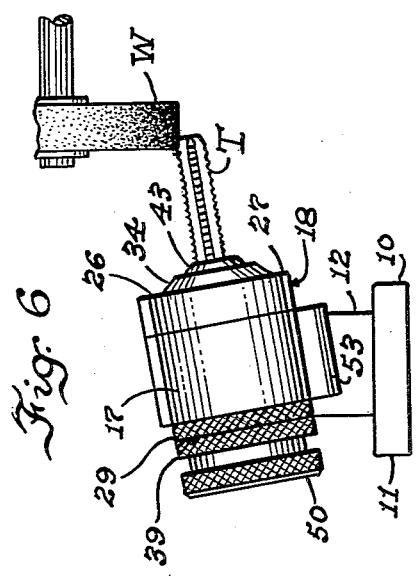
Inventor
Arthur G. Bergstrom

2,809,481
PORTABLE TAP SHARPENING FIXTURE

Arthur G. Bergstrom, Rockford, Ill.

Application June 9, 1955, Serial No. 514,166

13 Claims. (Cl. 51—234)

This invention relates to a new and improved portable tap sharpening fixture by means of which a small amount of movement, radially of the taps, may be obtained relative to the periphery of a grinding wheel in the sharpening of two, three and four-flute taps with much less of the complications in fixture construction that have been commonly associated with obtaining such movement in the past, such movement it being well known being necessary in order that in chamfering the end of each thread-cutting rib on a tap it will be cut progressively deeper from its leading edge to its trailing edge for "back-off."

A salient feature of my improved fixture is the use of an index sleeve that is rotatable in a housing through 90° in either direction from a zero position, or through 120° in either direction from the zero position, and has a bore that is about .013" below center and adapted to receive a collet sleeve that accommodates different collets for different sizes of taps to be sharpened, the housing being equipped with radially disposed stop pins in a row of holes that register with circumferentially extending grooves or slots provided in the index sleeve so that when a given pin is depressed for use in the appropriate groove or slot the collet sleeve can be turned with the index sleeve only so far as the slot permits and only in one direction relative to the housing for the grinding of the end of a rib on a tap with precisely the right amount of back-off. The collet sleeve can be locked to turn relative to the housing with the index sleeve in any one of four positions, 90° apart, for a four-flute tap or in two positions, 180° apart, for a two-flute tap, by insertion of a pin slidable in a hole in the indexing sleeve in appropriate ones of four holes provided in the collet sleeve spaced 90° apart. In like manner, the collet sleeve can be locked with another pin in any one of three poistions, 120° apart, to turn with the index sleeve relative to the housing in sharpening a three-flute tap, there being three holes, 120° apart, provided in the collet sleeve to receive the second pin slidable in a hole in the index sleeve.

The invention is illustrated in the accompanying drawings, in which—

Fig. 1 is a view partly in vertical section on line 1—1 of Fig. 2, of a tap sharpening fixture made in accordance with my invention;

Fig. 2 is a front view of Fig. 1;

Figs. 3 and 4 are a side view and end view, respectively, of the index sleeve;

Fig. 5 is an end view of a four-flute tap on an enlarged scale showing the manner in which the ribs are chamfered on their outer ends, and Fig. 6 is a side view of the fixture set up for a tap sharpening operation showing how the housing is inclined at a predetermined angle so as to obtain the same angle of bevel on the end of the tap in sharpening.

The same reference numerals are applied to corresponding parts in these views.

Referring to the drawings, the reference numeral 10 designates an L-shaped cast base, the flat bottom portion 11 of which is adapted to rest on a bench to support the fixture adjacent the grinding wheel in the sharpening of taps, the upright portion 12 having a bearing portion 13 in which a counterbore 14 is provided that receives a reduced cylindrical pilot extension 15 provided on the projecting radial hub portion 16 provided on the cast housing 17 of the fixture indicated generally by the reference numeral 18, so that the fixture may be set at any specified angle of inclination from a horizontal by rotary adjustment of the pilot extension 15 in the counterbore 14. A clamping screw 19 extends through a hole 20 in bearing 13 and threads in a hole 21 provided in the hub 16 and pilot extension 15 and serves when tightened to clamp the fixture 18 in adjusted position, there being an index mark 22 on the top of the bearing 13 which, at zero inclination of the fixture, registers with a zero mark on the graduations 23 provided circumferentially of the hub 16, adjustment of the fixture 18 either way being readable accurately on scale 23 by reference to the index mark 22. 90° adjustment is provided for, both ways from the zero setting, the fixture 18 being shown with zero inclination in Figs. 1 and 2.

The housing 17 is substantially cylindrical and has a substantially concentric bore 24 provided therein longitudinally thereof in which is rotatably mounted the reduced cylindrical shank portion 25 of an index sleeve 26. This sleeve has an enlarged front end portion 27 which slidably engages the front end of the housing 17, the other end of the sleeve being externally threaded, as indicated at 28, to receive a circular retaining nut 29. One or more set screws 30 are provided in this retaining nut to lock it securely in an adjusted position, allowing just enough end clearance between the parts for a close working fit of the index sleeve 26 in the housing. The bore 31 in the index sleeve 26 is eccentric approximately .013" below center, as indicated on a magnified scale at 32 in Fig. 4, and in this bore 31 the collet sleeve 33 is received with a close working fit. The collet sleeve 33 has a bevelled dial-like head end 34 with radial graduation marks 35 provided thereon in circumferentially spaced relation cooperating with an index mark 36 provided on the end of the index sleeve 26 so as to indicate 90° adjustments and 120° adjustments in either direction. The other end of the collet sleeve 33 has a counterbore 37 provided therein and is externally threaded, as indicated at 38, to receive a retaining nut 39, which, like the retaining nut 29, is arranged to be locked securely in adjusted position by means of one or more set screws 40 when the nut 39 is adjusted so as to leave just enough end clearance between the parts for a close working fit of the collet sleeve 33 in the index sleeve 26. A tap T to be sharpened has its shank 41 received in the concentric bore 42 in the collet 43 that may be of any conventional design suitable for the present purpose. The collet shown at 43 has the usual longitudinal slots like that indicated at 44 provided in the tapered head end 45 which wedgingly engages in the tapered end 46 of the bore 47 of the collet sleeve 33 and has a keyway 48 provided in the other end to receive a pin 49 that projects inwardly from a radial hole provided in the collet sleeve 33 to hold the collet against turning relative to the sleeve 33 when the collet is being tightened in the usual way by means of a draw nut 50. Draw nut 50 has a reduced end portion 51 received in the counterbore 37 and threaded on the external threads 52 provided on the inner end of the collet 43 and is arranged to be tightened to clamp the shank 41 of the tap T in place. The work can then be turned relative to a grinding wheel using the suitably knurled periphery of the nut 39 as a handle, whereby to turn the collet sleeve 33 and collet 43 as a unit through 90° or 120° in either direction, depending upon what the stop pins, later to be described, are set for. In passing, attention is called to the downward projection 53 provided on housing 17 longitudinally thereof, in which a smooth cylindrical bore 54 is provided parallel to bore 24 adapted to receive with a close working fit the smooth cylindrical shank portion 55 of a flat leaf spring pointer 56, as indicated in dotted lines in Fig. 1, such pointers being used sometimes by mechanics as an aid in the setting of taps in the collet 43 preliminary to sharpening. The pointer 56 can be turned to an out of the way position during the grinding operations and returned to operative position for use only during the setup operations.

A plate 57 is suitably secured to a flat seat 58 provided on the rim of the front end portion 27 of the index sleeve 26 at the top thereof and has two pins 59 and 60 guided in parallel holes 61 provided therein and slidable in registering parallel holes 62 provided in the front end portion 27 of the index sleeve 26. Pin 59 may be pushed in to enter either one of three radial holes 63 provided in equally circumferentially spaced relation, 120° apart, in the collet sleeve 33, whereby to enable accurately indexing the collet 43 one third of a revolution after completion of the sharpening operation on the end of each rib of a three-flute tap. In each sharpening operation on each rib of such a tap the index sleeve 26 will be turned by hand through 120° from a zero setting at index mark 36, in one direction for a right-hand tap and in the opposite direction for a left-hand tap, the two stop pins used in that connection being indicated at 64 and 65 in Fig. 1. Pin 60 may be pushed in to enter either one of four radial holes 66 provided in equally circumferentially spaced relation, 90° apart, in collet sleeve 33, to enable accurately indexing the collet 43 either 90° at a time, as in the case of a four-flute tap, or 180° at a time, as in the case of a two-flute tap. In the sharpening of four-flute taps, stop pins 67 and 68 are used, the one for right-hand taps and the other for left-hand taps. In sharpening two-flute taps, the operator works by eye and turns the work by hand through a half turn, being careful to avoid turning the work too far.

The stop pins 64, 65, 67 and 68, together with another stop pin 69, are guided in parallel holes 70 in another plate 71 similar to plate 57 that is suitably secured on a flat seat 72 provided on top of the housing 17, the holes 70 registering with holes 73 in bushings 74 that are pressed in holes 75 provided in the top portion of housing 17. The pins 64 and 65 register with arcuate slots or grooves 76 and 77, respectively, provided in parallel relationship in the reduced cylindrical shank portion 25 of the index sleeve 26, these grooves extending 120° from the index mark 36 in opposite directions, groove 76 extending in a counterclockwise direction and groove 77 in a clockwise direction, as clearly appears in Figs. 3 and 4. Groove 76 is used in the grinding of left-hand taps and groove 77 is used in the grinding of right-hand taps. Two other parallel arcuate grooves 78 and 79 are provided in the reduced cylindrical shank portion 25 of index sleeve 26 in register with pins 67 and 68, respectivly, and these extend through 90° in opposite directions with respect to index mark 36, the groove 78 in a counterclockwise direction and the groove 79 in a clockwise direction, as clearly appears in Figs. 3 and 4, groove 78 being used in the sharpening of left-hand taps and groove 79 being used in the sharpening of right-hand taps. A radial hole 80 is provided in the reduced cylindrical shank portion 25 of index sleeve 26 in register with pin 69, and when the pin 69 is pushed into the hole 80 the index sleeve 26 is locked against turning, and one can, therefore, loosen and tighten the draw nut 50 for the removal of a tap T and insertion and tightening of another tap. All of the pins 59, 60, 64, 65, 67, 68 and 69 preferably have springpressed detents cooperating with annular grooves provided in the pins to hold the same releasably in up or down position.

In operation, referring to Fig. 6, the fixture 18 is set at an angle of about 10° with respect to the hub 13 on the upright portion 12 of base 10 to obtain the proper inclination of the tap T with repect to the periphery of the grinding wheel W to be used in the sharpening of the tap. The operation, if he has a pointer 56, as shown in Fig. 1, uses this to get the tap turned precisely to the correct position before tightening the draw nut 50 to clamp the shank of the tap in the collet 43. Otherwise, the operator has to rely on his eye for this, being sure in either case to have the index sleeve 26 locked by means of pin 69 in the zero position in setting the tap preliminary to the tightening of the draw nut 50. Assuming it is a four-flute tap, right-hand, pin 69 is withdrawn so as to permit rotation of the index sleeve 26 by means of nuts 29 and 39, and the operator pushes pin 60 into one of the holes 66 to be sure the work is correctly indexed, and then pushes pin 68 into the slot or groove 79 and turns the index sleeve 26 as far as the pin 68 will permit, which is through 90° in a clockwise direction. Due to the eccentricity of bore 31 in index sleeve 26 the tap in the collet 43 in collet sleeve 33 disposed in bore 31 is eccentric to the same extent, and the correct back-off is produced in the grinding of the ends of the ribs R on the tap T as the tap is rotated clockwise with respect to the wheel W. The eccentricity of bore 31 indicated at 32 in Fig. 4 automatically causes the tap to be advanced radially of the tap against the wheel W as the chamfer indicated at 81 in Fig. 5 is being cut from the leading edge 82 to the trailing edge 83, the clockwise rotation of the collet being seen as counterclockwise rotation of the tap T looking at the end of the tap in Fig. 5, as indicated by arrow 84. For a left-hand tap the collet is turned in a counterclockwise direction and pin 67 is entered in the slot or groove 78. Upon completion of the grinding operation on the end of one rib, pin 60 is pulled out and the collet 43 is indexed by rotation of collet sleeve 33 through 90° and the pin 60 is inserted in the next hole 66, and the same operation as above described is repeated, and so on for all four ribs of a four-flute tap. This fixture enables resharpening worn taps over and over again and also permits repointing and retapering a tap the outer end of which has been broken off in a hole. In that way considerable savings can be effected and much of the waste that is now being suffered can be avoided. The fixture can also be used in the sharpening of other tools besides taps, like dovetail cutters for instance, and it is in the sharpening of tools like that that opposite inclination of the fixture 18 from that shown in Fig. 6 is required, using the graduations 23 on hub 16 running the other way from the zero mark on the top of the hub.

It is believed the foregoing description conveys a good understanding of the objects and advantages of my invention. The appended claims have been drawn to cover all legitimate modifications and adaptations.

I claim:

1. In a fixture of the character described, a housing having a cylindrical bore, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a pin slidably guided on said index sleeve for movement radially thereof and detachable engagement in either one of a plurality of radial holes provided in circumferentially spaced relation in said collet sleeve, whereby to secure the collet sleeve detachbly in different positions of rotary adjustment in said index sleeve, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

2. In a fixture of the character described, a supporting base, a housing pivotally adjustably mounted on said base, means for detachably securing said housing rigidly in an adjusted angularity relative to said base, said housing having a cylindrical bore provided therein, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

3. In a fixture of the character described, a housing having a cylindrical bore, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a plurality of pins slidably guided on said index sleeve for movement parallel to one another radially of said sleeve and detachable engagement selectively in radial holes provided in circumferentially spaced relation in said collet sleeve in the planes of said pins, the spacing of each set of holes being different to suit different work requirements, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

4. In a fixture of the character described, a supporting base, a housing pivotally adjustably mounted on said base, means for detachably securing said housing rigidly in an adjusted angularity relative to said base, said housing having a cylindrical bore provided therein, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a plurality of pins slidably guided on said index sleeve for movement parallel to one another radially of said sleeve and detachable engagement selectively in radial holes provided in circumferentially spaced relation in said collet sleeve in the planes of said pins, the spacing of each set of holes being different to suit different work requirements, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

5. In a fixture of the character described, a housing having a cylindrical bore, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a plurality of pins slidably guided on said index sleeve for movement parallel to one another radially of said sleeve and detachable engagement selectively in radial holes provided in circumferentially spaced relation in said collet sleeve in the planes of said pins, the spacing of each set of holes being different to suit different work requirements, and a plurality of sets of pins, two in each set, all slidably guided on said housing for movement radially thereof, and two arcuate slots provided in said index sleeve in register with and adapted to receive the two pins of each of said sets selectively, said slots extending circumferentially in opposite directions like distances from a certain longitudinal radial plane in said index sleeve, whereby to limit oscillatory movement of said index sleeve in either direction in the bore in said housing, the slots of different sets being of different lengths.

6. In a fixture of the character described, a supporting base, a housing pivotally adjustably mounted on said base, means for detachably securing said housing rigidly in an adjusted angularity relative to said base, said housing having a cylindrical bore provided therein, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a plurality of pins slidably guided on said index sleeve for movement parallel to one another radially of said sleeve and detachable engagement selectively in radial holes provided in circumferentially spaced relation in said collet sleeve in the planes of said pins, the spacing of each set of holes being different to suit different work requirements, and a plurality of sets of pins, two in each set, all slidably guided on said housing for movement radially thereof, and two arcuate slots provided in said index sleeve in register with and adapted to receive the two pins of each of said sets selectively, said slots extending circumferentially in opposite directions like distances from a certain longitudinal radial plane in said index sleeve, whereby to limit oscillatory movement of said index sleeve in either direction in the bore in said housing, the slots of different sets being of different lengths.

7. In a fixture of the character described, a housing having a cylindrical bore, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve 90° or 180° apart, another pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve 120° apart, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

8. In a fixture of the character described, a supporting base, a housing pivotally adjustably mounted on said base, means for detachably securing said housing rigidly in an adjusted angularity relative to said base, said housing having a cylindrical bore provided therein, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve 90° or 180° apart, another pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve 120° apart, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

9. In a fixture of the character described, a housing having a cylindrical bore, an index sleeve rotatable in the bore and having a bore provided therein parallel but eccentric with respect to the housing bore, a collet sleeve rotatably adjustably mounted in the eccentric bore in said index sleeve and carrying a collet keyed therein for holding a workpiece, said collet including a hand nut threaded on a projecting end portion thereof and adapted to be tightened to grip a workpiece in the collet, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve, a pin slidably guided on said housing for movement radially thereof and detachable engagement in a radial hole provided in said index sleeve to hold the index sleeve against turning while the aforesaid hand nut is tightened or loosened, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

10. In a fixture of the character described, a supporting base, a housing pivotally adjustably mounted on said base, means for detachably securing said housing rigidly in an adjusted angularity relative to said base, said housing having a cylindrical bore provided therein, an index sleeve rotatable in the bore and having a bore provided therein parallel but eccentric with respect to the housing bore, a collet sleeve rotatably adjustably mounted in the eccentric bore in said index sleeve and carrying a collet keyed therein for holding a workpiece, said collet including a hand nut threaded on a projecting end portion thereof and adapted to be tightened to grip a workpiece in the collet, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve, a pin slidably guided on said housing for movement radially thereof and detachable engagement in a radial hole provided in said index sleeve to hold the index sleeve against turning while the aforesaid hand nut is tightened or loosened, and two pins slidably guided on said housing for movement radially thereof and detachable engagement selectively in two arcuate slots provided in said index sleeve, said slots extending circumferentially in opposite directions like distances from a certain longitudinal radial plane in said index sleeve, whereby to limit oscillatory movement of said index sleeve in either direction in the bore in said housing.

11. In a fixture of the character described, a housing having a cylindrical bore, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve 90° apart, another pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve 120° apart, and two pins slidably guided on said housing for movement radially thereof and detachable engagement selectively in two arcuate slots provided in said index sleeve, one of which extends circumferentially through 90° and the other of which extends circumferentially through 120° from a certain longitudinally radial plane in said index sleeve, whereby to limit oscillatory movement of said index sleeve to 90° or 120° depending upon which of the two pins is engaged in its related arcuate slot.

12. In a fixture of the character described, a housing having a cylindrical bore, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve, and a plurality of sets of pins, two in each set, all slidably guided on said housing for movement radially thereof, and two arcuate slots provided in said index sleeve in register with and adapted to receive the two pins of each of said sets selectively, said slots extending circumferentially in opposite directions like distances from a certain longitudinal radial plane in said index sleeve, whereby to limit oscillatory movement of said index sleeve in either direction in the bore in said housing, the slots of different sets being of different lengths.

13. In a fixture of the character described, a supporting base, a housing pivotally adjustably mounted on said base, means for detachably securing said housing rigidly in an adjusted angularity relative to said base, said housing having a cylindrical bore provided therein, an index sleeve rotatable in the bore and having a bore provided therein parallel but eccentric with respect to the housing bore, a collet sleeve rotatably adjustably mounted in the eccentric bore in said index sleeve and carrying a collet therein for holding a workpiece, a pin slidably guided on said index sleeve for movement radially thereof and detachable engagement in either one of a plurality of radial holes provided in circumferentially spaced relation in said collet sleeve, whereby to secure the collet sleeve detachably in different positions of rotary adjustment in said index sleeve, and a plurality of sets of pins, two in each set, all slidably guided on said housing for movement radially thereof, and two arcuate slots provided in said index sleeve in register with and adapted to receive the two pins of each of said sets selectively, said slots extending circumferentially in opposite directions like distances from a certain longitudinal radial plane in said index sleeve, whereby to limit oscillatory movement of said index sleeve in either direction in the bore in said housing, the slots of different sets being of different lengths.

References Cited in the file of this patent

UNITED STATES PATENTS

| | | |
|---|---|---|
| 2,040,709 | Pruitt | May 12, 1936 |
| 2,486,044 | Lusk | Oct. 25, 1949 |
| 2,690,037 | Meyer | Sept. 28, 1954 |